(12) United States Patent
Efta et al.

(10) Patent No.: US 8,893,690 B2
(45) Date of Patent: Nov. 25, 2014

(54) CHECK VALVE FOR AN ENGINE BREATHER ASSEMBLY

(75) Inventors: Deven John Efta, Moorhead, MN (US); D. Brent Cluskey, Brimfield, IL (US)

(73) Assignee: Caterpillar Inc., Peoria, IL (US)

( * ) Notice: Subject to any disclaimer, the term of this patent is extended or adjusted under 35 U.S.C. 154(b) by 282 days.

(21) Appl. No.: 13/468,644

(22) Filed: May 10, 2012

(65) Prior Publication Data

US 2013/0298885 A1    Nov. 14, 2013

(51) Int. Cl.
  F02B 25/06    (2006.01)
(52) U.S. Cl.
  USPC ........................................ 123/574; 123/41.86
(58) Field of Classification Search
  USPC ........................................ 123/572–574, 41.86
  IPC ................ F01M 13/00,13/0011, 13/02, 13/028, F01M 13/04; F02M 13/02, 13/028, 13/04
  See application file for complete search history.

(56) References Cited

U.S. PATENT DOCUMENTS

| | | | |
|---|---|---|---|
| 3,257,995 A | 6/1966 | Schnabel | |
| 3,875,916 A | 4/1975 | Patton | |
| 4,549,520 A | 10/1985 | Tamba et al. | |
| 4,557,226 A | 12/1985 | Mayer et al. | |
| 4,840,152 A | 6/1989 | Watanabe et al. | |
| 4,922,881 A | 5/1990 | Tamba et al. | |
| 5,058,542 A | 10/1991 | Grayson et al. | |
| 5,205,243 A | 4/1993 | Buchholz | |
| 5,474,035 A | 12/1995 | Ming et al. | |
| 5,647,337 A | 7/1997 | Johnson et al. | |
| 5,803,025 A | 9/1998 | Feucht | |
| 5,878,731 A | 3/1999 | Bedkowski | |
| 5,937,837 A | 8/1999 | Shaffer et al. | |
| 6,116,866 A | 9/2000 | Tomita et al. | |
| 6,167,849 B1 | 1/2001 | Wilson | |
| 6,216,453 B1 | 4/2001 | Maurer | |
| 6,247,463 B1 | 6/2001 | Fedorowicz et al. | |
| 6,263,847 B1 | 7/2001 | Hoffmann et al. | |
| 6,394,079 B2 | 5/2002 | Takada et al. | |
| 6,439,174 B1 | 8/2002 | Shea et al. | |
| 6,644,290 B2 * | 11/2003 | Yoneyama et al. | ........... 123/572 |
| 6,659,094 B2 | 12/2003 | Nakamizo et al. | |
| 6,662,791 B2 | 12/2003 | Nakamizo et al. | |
| 6,866,031 B2 | 3/2005 | Spiegel et al. | |
| 6,892,715 B2 | 5/2005 | Norrick | |
| 6,904,883 B2 | 6/2005 | Snyder et al. | |
| 6,941,914 B2 | 9/2005 | Snyder et al. | |
| 2004/0182545 A1 | 9/2004 | Payne | |
| 2005/0045164 A1 | 3/2005 | Moriyama et al. | |

(Continued)

FOREIGN PATENT DOCUMENTS

| | | |
|---|---|---|
| JP | 57108406 | 7/1982 |
| JP | 61138811 | 6/1986 |
| JP | 2000034928 A | 2/2000 |

*Primary Examiner* — M. McMahon
(74) *Attorney, Agent, or Firm* — Miller, Matthias & Hull (57) ABSTRACT

A check valve for a breather assembly includes a valve seat defining a seat opening, a valve stop coupled to the valve seat, and a valve element disposed between the valve seat and the valve stop and including a first element surface and a second element surface. The valve element may be sufficiently flexible to actuate between a closed position, in which the first element surface engages the valve seat, and an open position, in which the second element surface engages the valve stop. The valve element may further include a passage, such as apertures, extending from the first element surface to the second element surface.

17 Claims, 5 Drawing Sheets

(56) References Cited

U.S. PATENT DOCUMENTS

| | | |
|---|---|---|
| 2005/0126562 A1 | 6/2005 | Rabinowitz et al. |
| 2005/0150474 A1 | 7/2005 | Snyder et al. |
| 2007/0231167 A1 | 10/2007 | Tsukamoto et al. |
| 2007/0251512 A1 | 11/2007 | Wallington |
| 2009/0301449 A1* | 12/2009 | Ogawa et al. ............ 123/574 |

* cited by examiner

CHECK VALVE FOR AN ENGINE BREATHER ASSEMBLY

TECHNICAL FIELD

The present disclosure relates to control of crankcase emissions from an internal combustion engine and, more particularly, to a "breather" assembly having a check valve for venting accumulated blow-by gases in the crankcase.

BACKGROUND

In internal combustion engines, fuel and air are introduced into cylinders for combustion. Pistons move within the cylinders under the influence of a crankshaft located in a crankcase. In each cylinder, a piston compresses the fuel and air mixture prior to combustion of the mixture. Combustion then drives the pistons and yields power output, which may drive a machine.

Combustion in the cylinder releases energy and generates combustion products and by-products, most of which are exhausted from the cylinder into an exhaust system of the engine during the exhaust phase of the combustion cycle. However, some of the combustion products may enter into the crankcase by blowing past seal rings around the pistons, and are thus termed "blow-by gases" or simply "blow-by." Blow-by gases contain contaminants normally found in exhaust gases, such as, for example, hydrocarbons (HC), carbon monoxide (CO), nitric oxides ($NO_x$), soot, and unburned or partially burned fuel. In addition, because the crankcase is partially filled with lubricating oil being agitated at high temperatures, the blow-by gases may also contain oil droplets and oil vapor. Lubricating oil in the crankcase tends to be atomized or otherwise entrained in the hot blow-by gases to form what may be termed an aerosol.

It may be desirable to vent blow-by gases in the crankcase (including, for example, entrained lubricating oil) as crankcase emissions to relieve pressure in the crankcase. The crankcase emissions may be vented to an air intake side of the engine for mixing with air and fuel introduced into the cylinders, with such systems generally identified as closed crankcase ventilation (CCV) systems, or alternatively the crankcase emissions may be vented to an exhaust system for treatment prior to release to the environment.

Some engines, such as large diesel engines, for example, utilize forced induction to enhance the power output of the engine. This may involve the use of superchargers or turbochargers in an engine design assembly. Returning crankcase emissions to the air intake side of engine, such as via a compressor in a supercharger or turbocharger, can result in fouling of the components (e.g., the compressor wheel) in a relatively short time period. One effect of reintroducing blow-by gases into an intake air of an engine may include producing contaminant buildup (e.g., oil coatings and sludge), within engine components including, for example, turbochargers and cooling devices such as air-to-air aftercoolers (ATAAC). Contaminants, such as those left by blow-by gases, within engine sub-components can negatively affect, for example, power production of the engine and possibly reduce the operational life thereof. The fouling may be further compounded in systems which, for example, utilize multiple turbocharger systems, as the heat increases in downstream compressor units. Again, other components, such as cooling units downstream of a supercharger or turbocharger, may be fouled. Even with the development of technologies to address purifying crankcase emissions before being returned to the intake system, some level of contamination may still exist that may be harmful to engine components, such as a supercharger or turbocharger, cooling units, or various other engine intake system components.

U.S. Patent Application Publication No. US 2007/0251512 A1 by Wallington ("Wallington") discloses an integrated check valve breather assembly for venting blow-by gases from a crankcase. The check valve includes a reed valve element that automatically actuates to an open position to vent crankcase emissions when the crankcase pressure reaches a threshold. When the check valve is open, gases from the crankcase are vented to an exhaust system, which may include a diesel particulate filter (DPF) and regeneration system. Because the blow-by gases are not recirculated to the engine air intake, the engine and associated components are protected from contact with the blow-by gases.

While the breather assembly of Wallington addresses the above-noted deleterious effects of blow-by gases, the check valve disclosed in Wallington is subject to premature wear. More specifically, during machine operation, the reed valve element would impact the valve set and valve stop with excessive force as it closed and opened, respectively. This not only hastened structural deterioration of the valve element, but also would generate pressure oscillations that could cause the valve element to vibrate against the valve seat, causing additional wear. When the reed valve element fails, blow-by gases and oil from the crankcase are allowed to flow through the CCV and into the DPF and regeneration system. The oil content of the blow-by gases would cause more frequent DPF regeneration events, which may cause premature failure of the DPF.

SUMMARY OF THE DISCLOSURE

In accordance with one aspect of the disclosure, a check valve is provided for a breather assembly, the check valve including a valve seat having a seat surface defining a seat opening, a valve stop coupled to the valve seat and defining a stop surface, and a valve element disposed between the valve seat and the valve stop and including a first element surface and a second element surface. The valve element may be sufficiently flexible to actuate between a closed position, in which the first element surface engages the seat surface of the valve seat, and an open position, in which the second element surface engages the stop surface of the valve stop. The valve element may define a passage extending from the first element surface to the second element surface.

In another aspect of the disclosure that may be combined with any of these aspects, a breather assembly is provided for an engine having a crankcase. The breather assembly may include a breather housing having an inlet port in fluid communication with the crankcase and an outlet port. A check valve may be disposed in the breather housing and include a valve seat having a seat surface defining a seat opening, a valve stop coupled to the valve seat and defining a stop surface, and a valve element disposed between the valve seat and the valve stop and including a first element surface and a second element surface. The valve element may be sufficiently flexible to actuate between a closed position, in which the first element surface engages the seat surface of the valve seat, and an open position, in which the second element surface engages the stop surface of the valve stop. The valve element may define a passage extending from the first element surface to the second element surface.

In another aspect of the disclosure that may be combined with any of these aspects, an engine assembly may include a crankcase, a housing having an inlet port in fluid communication with the crankcase and an outlet port, and an exhaust system fluidly communicating with the outlet port. A check valve may be disposed in the housing and include a valve seat having a seat surface defining a seat opening, a valve stop coupled to the valve seat and defining a stop surface, and a valve element disposed between the valve seat and the valve stop and including a first element surface and a second element surface. The valve element may be sufficiently flexible to actuate between a closed position, in which the first element surface engages the seat surface of the valve seat, and an open position, in which the second element surface engages the stop surface of the valve stop. The valve element may define a passage extending from the first element surface to the second element surface.

In another aspect of the disclosure that may be combined with any of these aspects, a check valve is provided for a breather assembly, the check valve including a valve seat having a seat surface defining a seat opening, the seat opening having a seat opening cross-sectional area, and a valve stop coupled to the valve seat and defining a stop surface. A valve element may be disposed between the valve seat and the valve stop and may include a first element surface and a second element surface. The valve element may be sufficiently flexible to actuate between a closed position, in which the first element surface engages the seat surface of the valve seat, and an open position, in which the second element surface engages the stop surface of the valve stop. The valve element may define at least one aperture extending from the first element surface to the second element surface, the at least one aperture having an aperture cross-sectional area that is approximately 5-20% of the seat opening cross-sectional area.

In another aspect of the disclosure that may be combined with any of these aspects, the seat opening may have a seat opening cross-sectional area, and the passage may have a passage cross-sectional area that is approximately 5-20% of the seat opening cross-sectional area.

In another aspect of the disclosure that may be combined with any of these aspects, the seat opening may have a seat opening cross-sectional area, and the passage may have a passage cross-sectional area that is approximately 5-10% of the seat opening cross-sectional area.

In another aspect of the disclosure that may be combined with any of these aspects, the passage may include at least one aperture extending through the valve element.

In another aspect of the disclosure that may be combined with any of these aspects, the valve element may include a side periphery, and the at least one aperture is spaced from the side periphery.

In another aspect of the disclosure that may be combined with any of these aspects, the valve element may include a longitudinal axis, and the at least one aperture is disposed along the longitudinal axis.

In another aspect of the disclosure that may be combined with any of these aspects, the passage may include a plurality of apertures extending through the valve element.

In another aspect of the disclosure that may be combined with any of these aspects, a housing may define an inlet fluidly communicating with an engine crankcase and an outlet fluidly communicating with an exhaust system, in which the valve element is configured to move to the open position when a pressure differential between an upstream fluid pressure at the housing inlet and a downstream fluid pressure at the housing outlet exceeds a pressure differential threshold.

DETAILED DESCRIPTION

Embodiments of a check valve for a breather assembly are disclosed for use with an engine. The check valve controls flow of blow-by gases from a crankcase of the engine to an exhaust system. The check valve includes a valve element configured to actuate between a closed position, in which it engages a valve seat, and an open position, in which it is spaced from the valve seat and may engage a valve stop. The valve element is formed with a passage, such as one or more apertures, that extends from a first surface of the valve element to a second surface of the valve element, thereby to reduce a pressure differential acting on the valve element. The reduced pressure differential eliminates excessive wear due to vibration of the valve element at resonant frequencies, thereby extending the life of the check valve components.

Figure 1:
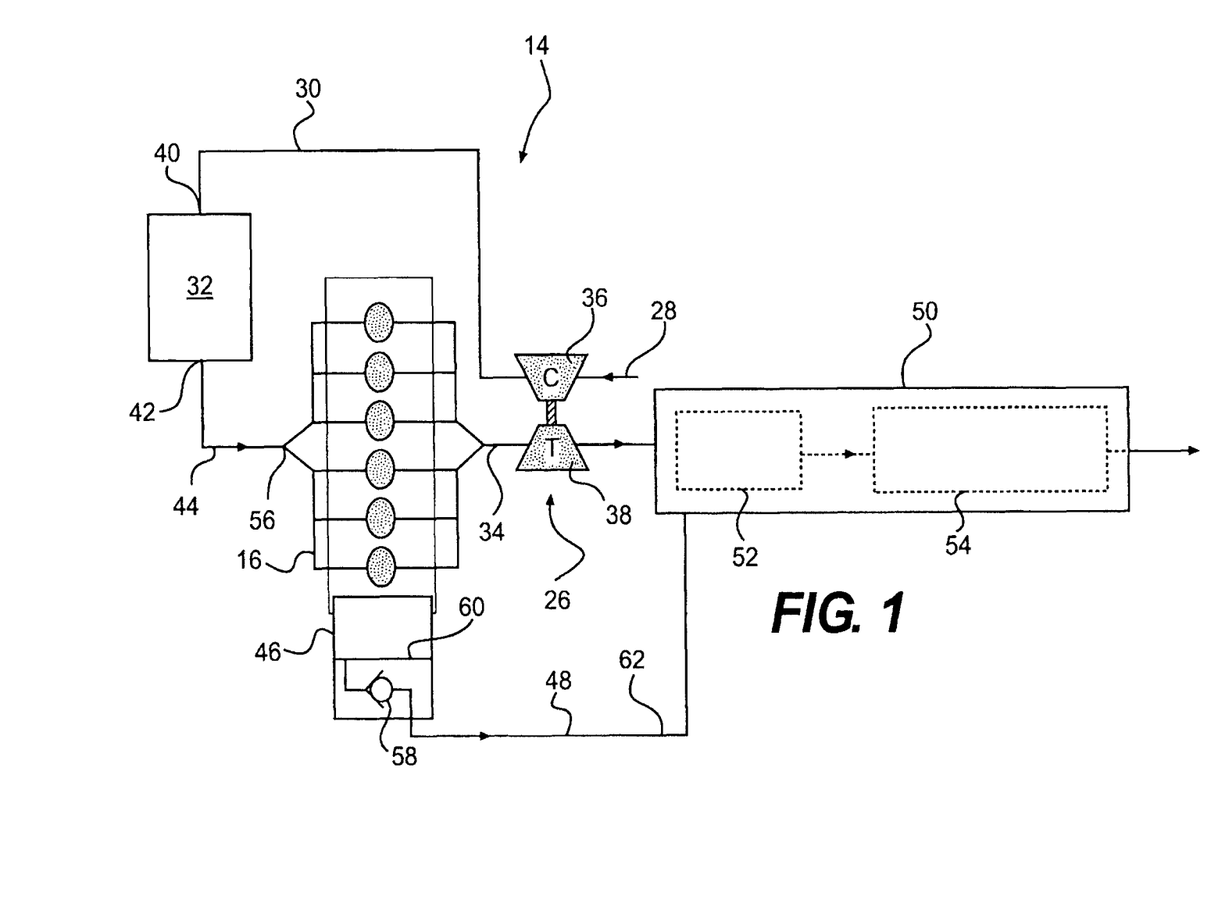
FIG. 1 is a diagrammatic view of an engine according to an exemplary embodiment.

Referring to FIG. 1, an example of an engine 14 is illustrated. The engine 14 may be any type of engine, such as an internal combustion engine that uses gasoline, diesel, or other fuel type. The engine 14 may be used to provide power to a drive assembly of a machine, such as a mechanical or electric drive train. The machine may be any type of stationary or mobile machine, such as an off-highway truck. The engine 14 may include a turbocharger 26 for compressing intake air 28 into heated charged air 30, and a cooler such as an air-to-air aftercooler (ATAAC) 32 for cooling the heated charged air 30 prior to entering an air intake manifold 56. Each of the engine sub-components may have a variety of configurations to suit a particular application. Exemplary sub-components of the engine 14 will be discussed, but the presently disclosed system is not limited to these specific configurations.

The turbocharger 26 may include a compressor 36, powered by a turbine 38 driven by engine exhaust flow 34. The compressor 36 may pressurize intake air 28 to allow a greater mass of fuel/air mixture in the engine cylinders of the engine 14, thereby to increase power and/or improve engine efficiency. However, as a byproduct of pressurization, the temperature of the intake air 28 may also increase, which may be undesirable. As noted above, heated charged air 30 may be cooled prior to entering the air intake manifold 56 by passing through the ATAAC 32.

In one exemplary embodiment, heated charged air 30 from the turbocharger compressor 36 may be admitted into the ATAAC 32 through an inlet port 40. After traversing the ATAAC 32 and exchanging heat with the relatively cool ambient air passing over and around the ATAAC 32, the previously heated charged air 30 may be exhausted through an outlet port 42 of the ATAAC 32 as relatively cooled charged air 44, which may then be routed to the engine air intake manifold 56. As shown in FIG. 1, the engine air intake manifold 56 of the engine 14 may include one or more passages or pipes which may be used to conduct cooled charged air 44 to one or more engine cylinders.

During operation, blow-by gases may build up in a crankcase 16 of the engine 14. A breather assembly 46 may be operably coupled to the crankcase 16 for venting blow-by gases 48 from the engine crankcase.

Thus, the disclosed embodiment shown in FIG. 1 illustrates the breather assembly 46 fluidly communicating with an exhaust system 50, such as via conduit 62. In one exemplary embodiment, the exhaust system 50 may include aftertreatment devices for receiving and treating not only engine exhaust flow 34, but also blow-by gases 48 such as those expelled from the breather assembly 46. These aftertreatment devices may include, for example, a regeneration system 52 and a particulate filter 54 for treating engine and crankcase emissions prior to being released into the environment. While exemplary sub-components of the exhaust system 50 have been described, the disclosed embodiment should not be limited to these specific configurations described herein.

The breather assembly 46 may include a filter media 60 which may include porous or mesh material. The filter media 60 may facilitate trapping of oil within an interior region of the breather assembly 46 as blow-by gases 48 pass through and toward the exhaust system 50.

In order to restrict reverse flow of exhaust or blow-by gases 48 back into the crankcase 16, a check valve 58 may be provided within the breather assembly 46. In one embodiment, the check valve 58 may include a reed or flapper type valve including, for example, flexible material such as spring steel. The check valve 58 may be oriented to allow blow-by gases 48 to escape from the breather assembly 46, while restricting a reverse flow of blow-by gases 48 back into the crankcase 16.

Figure 2:
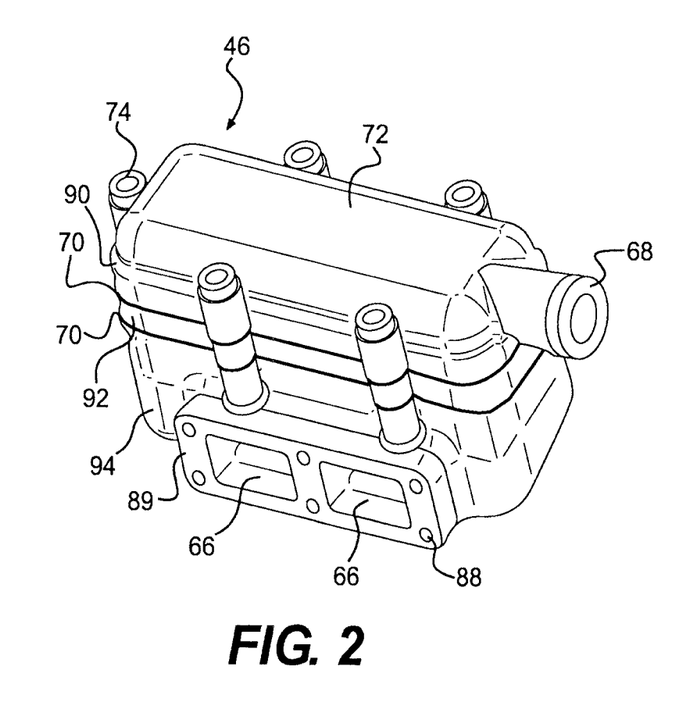
FIG. 2 is a perspective view of an exemplary breather assembly provided on the engine of FIG. 1.

Turning to FIG. 2, the breather assembly 46 is shown having a housing assembly 72. The housing assembly 72 may include a three part assembly including, for example, a top support section 90, a mid support section 92, and a bottom support section 94. Gaskets 70, including flexible or compressible material such as rubber or fibrous material, may be inserted between each of the three sections 90, 92, 94. Inlet ports 66 may be generally configured along a side of the bottom support section 94 and may fluidly communicate with the crankcase 16 to receive blow-by gases 48. In one embodiment, an exterior surface region 89 may circumscribe the inlet ports 66. Receiving holes 88 may be configured to receive respective retaining members such as threaded bolts. An outlet port 68 may be located at one end of the top support section 90 and may fluidly communicate with the exhaust system 50 to vent blow-by gases 48 out of the breather assembly 46.

Figure 3:
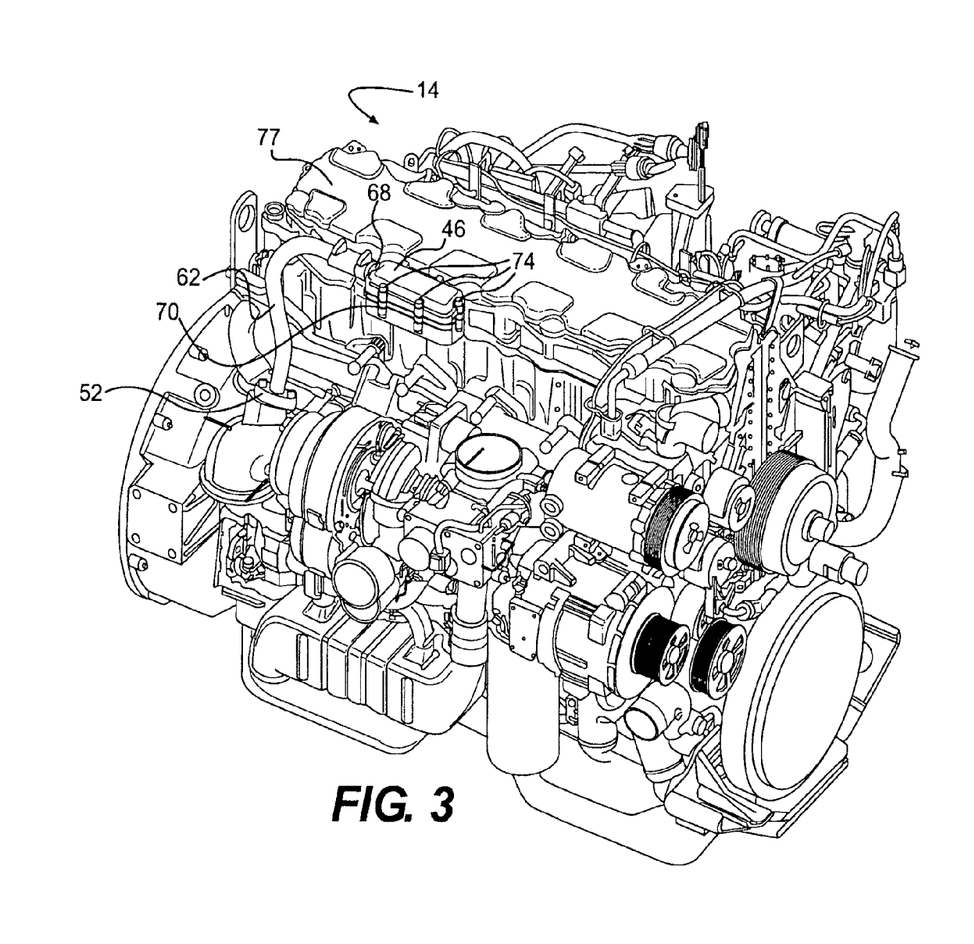
FIG. 3 is a perspective view of an engine assembly including the breather assembly of FIG. 2.

Turning to FIG. 3, the exemplary breather assembly 46 is shown coupled to the engine 14. In one embodiment, the inlet ports 66 (FIG. 2) of the breather assembly 46 are mounted flush to a valve cover assembly 77. The conduit 62 is shown coupled at one end to the outlet port 68 of the breather assembly 46. The other end of the conduit 62 may be coupled to the regeneration system 52 of the exhaust system 50. Thus, as the crankcase 16 becomes pressurized, blow-by gases 48 may be vented from the valve cover assembly 77 of the engine 14, through the breather assembly 46, and into the regeneration system 52.

Figure 4:
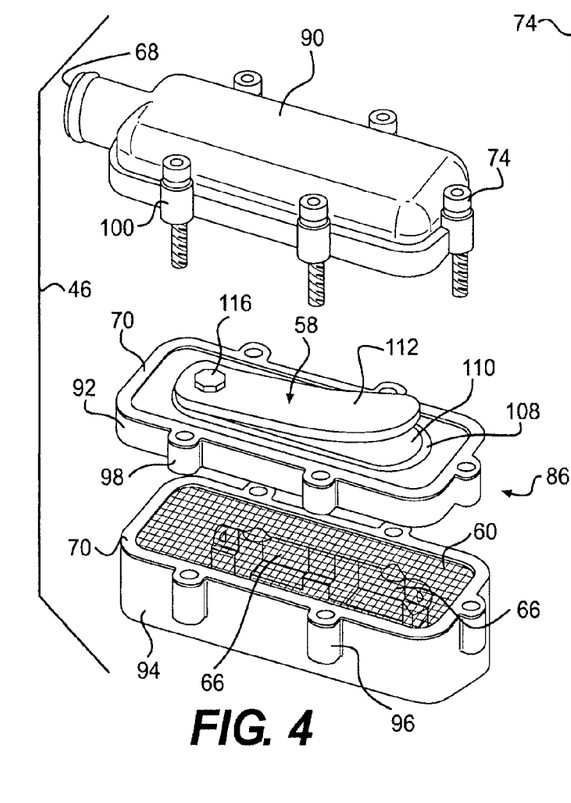
FIG. 4 is an exploded perspective view of the components of the breather assembly of FIG. 2.

FIGS. 4-8 illustrate various components which may be included within an exemplary embodiment of the breather assembly 46. Turning to FIG. 4, the top support section 90, mid support section 92, and bottom support section 94 are shown relative to one another and positioned for assembly. The top support section 90 may include apertures 100 for receiving bolts 74. Similarly, the mid support section 92 and the bottom support section 94 may include apertures 98 and 96, respectively, for receiving bolts 74. The bolt receiving apertures 96, 98, 100 may be located relative to one another in alignment to receive the bolt 74. In one embodiment, the bolt receiving aperture 96 may threadedly receive the bolt 74 in order to retain the bolt 74 therein. Thus, the bolt 74 may pass successively through the bolt receiving apertures 100, 98, 96 and be retained therein.

The gasket 70 is shown in alignment with the mid support section 92, and, in the disclosed embodiment, is disposed between the mid support section 92 and the top support section 90 in a final assembly. The mid support section 92 may include installed components of a check valve assembly 86 in accordance with an exemplary embodiment of the disclosure. The mid support section 92 may include a recessed portion 114 for receiving a valve seat 108. A receiving hole 106 may be disposed within the recessed portion 114 to receive a retaining member 116 (FIG. 5) in a final assembly. In one embodiment, the retaining member 116 may include a threaded bolt member. The receiving hole 106 may include mating threads for receiving a threaded configuration of the retaining member 116. The mid support section 92 may also include an opening 104, such as within the recessed portion 114, for venting blow-by gases 48 received through the inlet ports 66 (FIG. 4) and an inner chamber 118 (FIG. 5) of the breather assembly 46.

Figure 6:
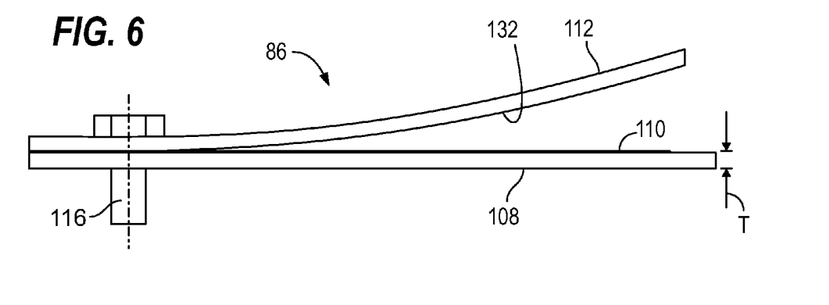
FIG. 6 is a side elevation view of an embodiment of a check valve used in the breather assembly of FIG. 2.
Figure 7:
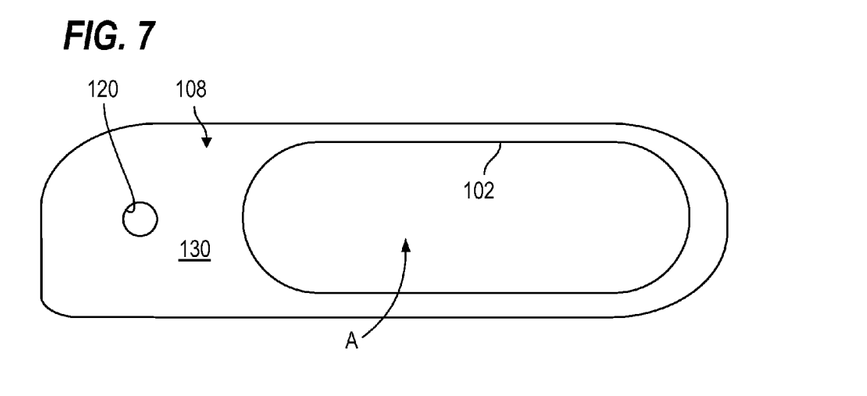
FIG. 7 is an enlarged plan view of an embodiment of a valve seat used in the check valve of FIG. 6.

An exemplary, assembled check valve assembly 86 is shown in FIG. 6 that includes a valve seat 108, a valve stop 112, and a valve element 110. The valve seat 108 may have a relatively rigid construction and includes a substantially planar seat surface 130 defining a seat opening 102, as best shown in FIG. 7. The seat opening 102 has a cross-sectional area "A" that may be sized to receive a flow of blow-by gases. The valve seat may have a body thickness "T" that is sufficient to withstand impact by the valve element 110. The valve seat 108 may also include an opening 120 to receive the retaining member 116 (FIG. 4) in a final assembly.

Figure 5:
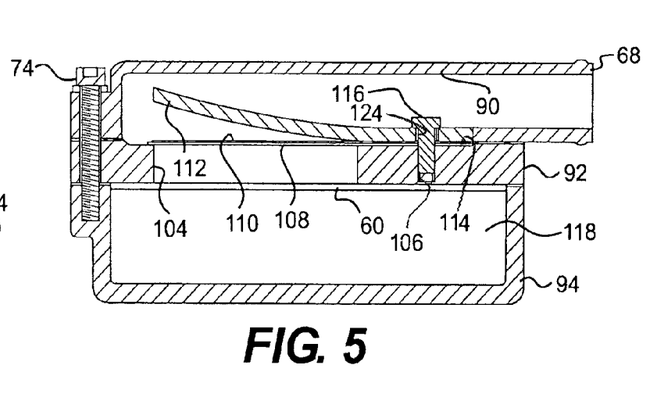
FIG. 5 is a side elevation view, in cross-section, of the breather assembly of FIG. 2.

The valve stop 112 is coupled to the valve seat 108 and defines a stop surface 132 for engaging the valve element 110 that is spaced from the valve seat 108. The stop surface 132 may have a substantially arcuate shape to prevent over-deflection of the valve element 110 in a direction away from the valve seat 108 as blow-by gases 48 are vented from the inner chamber 118 toward the outlet port 68 (FIG. 5). Accordingly, the valve stop 112 may have a sufficiently rigid construction to stop the travel of the valve element 110 away from the valve seat 108. The valve stop 112 may also include an opening 124 for receiving the retaining member 116 (FIG. 4) in a final assembly.

The valve element 110 is disposed between the valve seat 108 and the valve stop 112 and is configured to allow blow-by gases 48 to escape from breather assembly 46, while restricting a reverse flow of blow-by gases 48 to the crankcase 16. The valve element 110 may have a relatively flexible construction that allows it to flex between a closed position, in which a first element surface 134 engages the valve seat surface 130, and an open position, in which a second element surface 136 engages the stop surface 132 of the valve stop 112. For example, the valve element 110 may be formed of spring steel material that is sufficiently thin to allow the valve element 110 to flex. Alternatively, the valve element 110 may include other materials suitable for venting blow-by gases such as synthetic resin material. In one disclosed embodiment, the valve element 110 (such as one including spring steel material) may have a thickness of approximately 0.305 mm (0.012 inch). Other suitable thicknesses of the valve element 110 may be utilized which may not only restrict reverse flow but also remain pliable for responding to appropriate crankcase pressure to vent blow-by gases 48. The valve element 110 may include an opening 122 for receiving the retaining member 116 (FIG. 4) in a final assembly.

Figure 8:
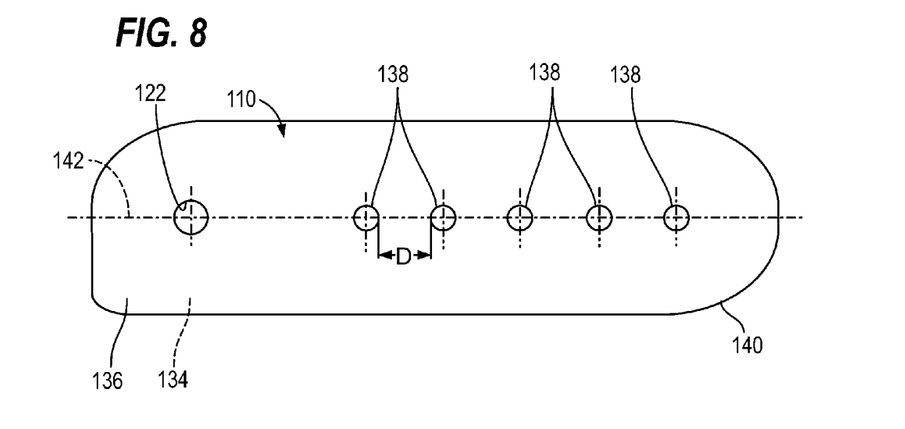
FIG. 8 is an enlarged plan view of an embodiment of a valve element used in the check valve of FIG. 6.

The valve element 110 may include a passage that fluidly communicates from the first element surface 134 to the second element surface 136 when the valve element 110 engages the valve seat surface 130 in the closed position. In the exemplary embodiment, the passage is formed as a plurality of apertures 138 extending through the valve element 110. While the exemplary embodiment includes five apertures 138, it will be appreciated that less than five apertures (including a single aperture) or more than five apertures may be provided without departing from the scope of this disclosure. Additionally, while the apertures 138 are illustrated as being circular in shape and having substantially the same size, other aperture shapes, as well as apertures of different sizes, may be used. Still further, while the passage is shown as one or more apertures 138 extending through the entire thickness of the valve element 110, the passage may take alternative forms such as a channel that extends from the first element surface 134 and over an edge of the valve element 110 to the second element surface 136.

To maintain the structural integrity of the valve element 110, the apertures 138 may be spaced from a side periphery 140 of the valve element 110. For example, in the illustrated embodiment, the apertures 138 are aligned along a longitudinal axis 142 extending through a center of the valve element 110 (FIG. 8). Still further, the apertures 138 may be sufficiently spaced from each other to avoid forming excessive stress concentrations during operation. For example, the apertures 138 may be spaced by a distance "D" that is greater than a diameter of each aperture 138.

Turning again to FIG. 4, a final assembly of the mid support section 92 may include the valve seat 108 seated upon the recessed portion 114 (FIG. 6) of mid support section 92, the valve element 110 seated upon the valve seat 108, and the valve stop 112 seated upon the valve element 110. An exemplary embodiment may include the respective openings 106, 120, 122, and 124 in alignment to successively receive the retaining member 116 therein. The retaining member 116 may facilitate retaining the mid support section 92, the valve seat 108, the valve element 110 and the valve stop 112 in a fixed position with respect to one another.

As further shown in FIG. 4, the bottom support section 94 may include a filter media 60. The gasket 70 is shown in alignment with the bottom support section 94, and, in the disclosed embodiment, is disposed between the mid support section 92 and the bottom support section 94 in a final assembly.

Industrial Applicability

The present disclosure is applicable to machines that require venting of emissions from an engine while restricting a backflow of emissions to the engine. For example, the disclosed breather assembly 46 may be used in connection with internal combustion engines. In particular, and as shown in FIG. 1, breather assembly 46 may serve to vent blow-by gases 48 from crankcase 16 of engine 14 while restricting vented blow-by gases 48 from returning to engine components. Thus, protection of engine components from vented gases may be achieved utilizing an efficient and cost-effective assembly, which may increase the service life of the engine components.

When assembled on the engine 14 and fluidly coupled to the exhaust system 50, the breather assembly 46 may be configured to receive blow-by gases 48, filter the received gases, and emit the filtered gases directly to exhaust system 50. An effect of routing crankcase emissions directly to the exhaust system 50, as described herein, may produce an increased pressure within the crankcase 16. Hence, the crankcase pressure obtained by the disclosed embodiment may achieve pressures greater than CCV systems which route blow-by gases to the intake system of the engine. In one example, the crankcase pressure achieved by the disclosed embodiment may be on an order of 5 psi or greater. Whereas, comparatively, some traditional CCV systems (e.g., those routing blow-by gases 48 to the intake system) may produce a crankcase pressure less than 1 psi. Thus, the exemplary breather assembly 46 may help direct blow-by gases in the crankcase 16 to the exhaust system 50.

In operation, blow-by gases 48 may escape from the combustion chambers into the crankcase 16 during operation of the engine 14. The blow-by gases 48 may tend to accumulate within the crankcase 16 and increase the pressure therein. When appropriate pressurization of the crankcase 16 occurs (such as when the pressure within crankcase 16 overcomes the pressure of exhaust system 50), blow-by gases 48 may be vented by entering the inlet ports 66 of the breather assembly 46. Blow-by gases 48 may accumulate within the inner chamber 118 and be filtered through the filter media 60. Within the inner chamber 118, oil may separate from the blow-by gases 48 by gravity and condensation and drip back into the crankcase 16. In addition, oil may be trapped within the filter media 60. Blow-by gases 48 may then pass through the valve seat opening 102 and past the valve element 110 to be vented through the outlet port 68.

Discharge of blow-by gases 48 in the described manner may cause the valve element 110 to deflect away from the valve seat opening 102 and toward the valve stop 112. In this open position, blow-by gases 48 may be vented from the crankcase 16. The conduit 62 may couple the outlet port 68 of the breather assembly 46 to the exhaust system 50 in order to convey blow-by gases 48 to the exhaust for treatment and/or release into the environment.

When the crankcase pressure is not sufficient to overcome exhaust system pressure, the valve element 110 may restrict heat from the exhaust system from reaching the crankcase 16. Under such operating conditions, the valve element 110 is deflected toward the valve seat 108, thereby restricting fluid communication between the exhaust system 50 and the crankcase 16.

The passage reduces a pressure differential across the valve element 110 to reduce the amount of force with which the valve element 110 impacts the valve seat 108 and the valve stop 112. In the exemplary embodiments, the passage is formed by a plurality of apertures 138 that extend through the valve element 110. The apertures 138 define flow paths that permit a small amount of fluid communication through the valve element 110 even when the valve element 110 engages the valve seat 108 in the closed position. While the passage reduces magnitude of force with which the valve element 110 impacts the valve seat 108 and valve stop 112, the size of the passage may be controlled to restrict the amount of heat from the exhaust system that can reach the crankcase 16. Accordingly, applicant has found a suitable aggregate cross-sectional area of the apertures 138 to be approximately 5-20% of a cross-sectional area "A" of the seat opening 102. In some applications, a suitable aggregate cross-sectional area of the apertures 138 is approximately 5-10% of the cross-sectional area "A" of the seat opening 102. Sizing the passage relative to the seat opening in this manner increases the service life of the valve element 110 by reducing the differential pressure across the valve element 110, while providing a sufficient barrier to prevent excessive heat from the exhaust system 50 from reaching the crankcase 16.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A check valve for a breather assembly, the check valve comprising:
   a valve seat having a seat surface defining a seat opening, the seat opening having a seat opening cross-sectional area;
   a valve stop coupled to the valve seat and defining a stop surface; and
   a valve element disposed between the valve seat and the valve stop and including a first element surface and a second element surface, the valve element being sufficiently flexible to actuate between a closed position, in which the first element surface engages the seat surface of the valve seat, and an open position, in which the second element surface engages the stop surface of the valve stop, the valve element defining a passage extending from the first element surface to the second element surface when the valve element is in the closed position, the passage having a passage cross-sectional area that is approximately 5-20% of the seat opening cross-sectional area.

2. The check valve of claim 1, in which the seat opening has a seat opening cross-sectional area, and in which the passage has a passage cross-sectional area that is approximately 5-10% of the seat opening cross-sectional area.

3. The check valve of claim 1, in which the passage comprises at least one aperture extending through the valve element.

4. The check valve of claim 3, in which the valve element comprises a side periphery, and in which the at least one aperture is spaced from the side periphery.

5. The check valve of claim 3, in which the valve element comprises a longitudinal axis, and in which the at least one aperture is disposed along the longitudinal axis.

6. The check valve of claim 1, in which the passage comprises a plurality of apertures extending through the valve element.

7. A breather assembly for an engine having a crankcase, the breather assembly comprising:
   a breather housing having an inlet port in fluid communication with the crankcase and an outlet port; and
   a check valve disposed in the breather housing, the check valve including:
      a valve seat having a seat surface defining a seat opening, the seat opening having a seat opening cross-sectional area;
      a valve stop coupled to the valve seat and defining a stop surface; and
      a valve element disposed between the valve seat and the valve stop and including a first element surface and a second element surface, the valve element being sufficiently flexible to actuate between a closed position, in which the first element surface engages the seat surface of the valve seat, and an open position, in which the second element surface engages the stop surface of the valve stop, the valve element defining a passage extending from the first element surface to the second element surface when the valve element is in the closed position, the passage having a passage cross-sectional area that is approximately 5-20% of the seat opening cross-sectional area.

8. The breather assembly of claim 7, in which the passage comprises at least one aperture extending through the valve element.

9. The breather assembly of claim 8, in which the valve element comprises a side periphery, and in which the at least one aperture is spaced from the side periphery.

10. The breather assembly of claim 8, in which the valve element comprises a longitudinal axis, and in which the at least one aperture is disposed along the longitudinal axis.

11. An engine assembly, comprising:
    a crankcase;
    a housing having an inlet port in fluid communication with the crankcase and an outlet port;
    an exhaust system fluidly communicating with the outlet port; and
    a check valve disposed in the housing, the check valve including:
       a valve seat having a seat surface defining a seat opening, the seat opening having a seat opening cross-sectional area;
       a valve stop coupled to the valve seat and defining a stop surface; and
       a valve element disposed between the valve seat and the valve stop and including a first element surface and a second element surface, the valve element being sufficiently flexible to actuate between a closed position, in which the first element surface engages the seat surface of the valve seat, and an open position, in which the second element surface engages the stop surface of the valve stop, the valve element defining a passage extending from the first element surface to the second element surface when the valve element is in the closed position, the passage having a passage cross-sectional area that is approximately 5-20% of the seat opening cross-sectional area.

12. The engine assembly of claim 11, in which the passage comprises at least one aperture extending through the valve element.

13. The engine assembly of claim 12, in which the valve element comprises a side periphery, and in which the at least one aperture is spaced from the side periphery.

14. The engine assembly of claim 12, in which the valve element comprises a longitudinal axis, and in which the at least one aperture is disposed along the longitudinal axis.

15. A check valve for a breather assembly, the check valve comprising:
- a valve seat having a seat surface defining a seat opening, the seat opening having a seat opening cross-sectional area;
- a valve stop coupled to the valve seat and defining a stop surface; and
- a valve element disposed between the valve seat and the valve stop and including a first element surface and a second element surface, the valve element being sufficiently flexible to actuate between a closed position, in which the first element surface engages the seat surface of the valve seat, and an open position, in which the second element surface engages the stop surface of the valve stop, the valve element defining at least one aperture extending from the first element surface to the second element surface when the valve element is in the closed position, the at least one aperture having an aperture cross-sectional area that is approximately 5-20% of the seat opening cross-sectional area.

16. The check valve of claim 15, in which the valve element comprises a side periphery, and in which the at least one aperture is spaced from the side periphery.

17. The check valve of claim 15, in which the valve element comprises a longitudinal axis, and in which the at least one aperture is disposed along the longitudinal axis.

* * * * *

UNITED STATES PATENT AND TRADEMARK OFFICE
CERTIFICATE OF CORRECTION

PATENT NO. : 8,893,690 B2
APPLICATION NO. : 13/468644
DATED : November 25, 2014
INVENTOR(S) : Efta et al.

Page 1 of 1

It is certified that error appears in the above-identified patent and that said Letters Patent is hereby corrected as shown below:

In the Specification:

Column 7, line 55, delete "Industrial Applicability" and insert -- INDUSTRIAL APPLICABILITY --.

Signed and Sealed this
Twenty-fourth Day of November, 2015

Michelle K. Lee
*Director of the United States Patent and Trademark Office*